(12) United States Patent
Taira (10) Patent No.: US 8,514,402 B2
(45) Date of Patent: Aug. 20, 2013

(54) PHOTODETECTOR DEVICE AND PHOTODETECTION METHOD AS WELL AS A MICROSCOPE AND AN ENDOSCOPE

(75) Inventor: Kenji Taira, Kodaira (JP)

(73) Assignee: Olympus Corporation, Tokyo (JP)

( * ) Notice: Subject to any disclaimer, the term of this patent is extended or adjusted under 35 U.S.C. 154(b) by 163 days.

(21) Appl. No.: 12/958,578

(22) Filed: Dec. 2, 2010

(65) Prior Publication Data
US 2011/0128532 A1   Jun. 2, 2011

(30) Foreign Application Priority Data

Dec. 2, 2009   (JP) .................................. 2009-274358

(51) Int. Cl.
*G01B 9/02*   (2006.01)
(52) U.S. Cl.
USPC ......................................................... 356/484
(58) Field of Classification Search
USPC ................... 356/484–490; 250/550
See application file for complete search history.

(56) References Cited

U.S. PATENT DOCUMENTS

| | | | |
|---|---|---|---|
| 3,780,217 A * | 12/1973 | Sawatari .......................... | 348/80 |
| 6,025,938 A * | 2/2000 | Kathman et al. .................. | 359/9 |
| 6,141,138 A * | 10/2000 | Machida et al. ............... | 359/279 |
| 6,788,861 B1 * | 9/2004 | Utsui et al. ..................... | 385/119 |
| 7,012,697 B2 * | 3/2006 | McAlexander et al. ....... | 356/484 |
| 7,027,743 B1 * | 4/2006 | Tucker et al. .................. | 398/204 |
| 2007/0176531 A1 * | 8/2007 | Kinoshita et al. ............. | 313/486 |

FOREIGN PATENT DOCUMENTS
JP   2890309   5/1999

* cited by examiner

*Primary Examiner* — Gregory J Toatley
*Assistant Examiner* — Shawn Decenzo
(74) *Attorney, Agent, or Firm* — Scully, Scott, Murphy & Presser, P.C.

(57) ABSTRACT

Provided are a photodetector device and a photodetection method as well as a microscope and an endoscope allowing the heterodyne detection of a desired light to be detected with high sensitivity and at a high SN ratio. A photodetector device comprises a local light emitting unit for generating a local light in temporally unstable interference condition with a light to be detected and a photoelectric conversion unit for generating beat signals between the local light and the light to be detected by photoelectric conversion. The light is detected in heterodyne detection based on an output of the photoelectric conversion unit.

16 Claims, 10 Drawing Sheets

PHOTODETECTOR DEVICE AND PHOTODETECTION METHOD AS WELL AS A MICROSCOPE AND AN ENDOSCOPE

CROSS-REFERENCE TO RELATED APPLICATION

The present application claims priority from Japanese Application No. 2009-274358, filed on Dec. 2, 2009, the content of which is incorporated herein by reference.

TECHNICAL FIELD

The present invention relates to a photodetector device and a photodetection method as well as a microscope and an endoscope.

BACKGROUND OF THE INVENTION

The technique for detecting a desired signal light (a light to be detected) is a basic and important element in various systems in which light is used, such as vital observation system, sensor system, security system, laser radar system and has a huge influence on their performance. In particular, detection technique with high speed and high sensitivity is widely required.

It is necessary to perform photodetection with high speed in order to realize precise observation, since the condition or shape of a biological body varies momentarily in the vital observation. There is also an upper limit for amount of light with respect to illumination light or excitation light with which a biological sample is irradiated, since the biological body is easily damaged by the light irradiation. Therefore, light signal which can be obtained from the biological body is generally weak. For these reasons, photodetection technique with high speed and high sensitivity is widely expected in the vital observation in which light is used.

Typical light elements used at present include PMT (Photo Multiplier Tube), APD (Avalanche Photo Diode), PD (Photo Diode). In PMT and APD, electron multiplication takes place within a detection element, so that photodetection with high sensitivity is realized. In the case of PD, distinctly high response speed can be realized, but a signal is generally amplified by means of an electric amplifier, since electric amplification function is not provided within the detection element. That is to say, the signal is amplified electrically for each element of PMT, APD, PD, so that sensitivity is improved.

Typical two-dimensional detectors include a CCD (Charge Coupled Device), a CMOS (Complementary Metal Oxide Semiconductor), EM-CCD (Electron Multiplying-CCD), an EB-CCD (Electron Bombardment-CCD) and an I-CCD (Intensified-CCD). If a weak light is detected by the CCD or the CMOS, it is necessary to arrange an electric amplifier downstream thereof, as in the case of APD. The EM-CCD and the EB-CCD have a function of electric amplification, as in the case of the APD, so that high sensitivity is realized. For the I-CCD, II (Image Intensifier) is arranged upstream of the CCD. The II temporarily converts an incident light signal into an electric signal for the electric amplification in a MPC (Micro Channel Plate) integrated in the II and then allows the amplified electrons to impinge on a fluorescent plate to convert the amplified electric signal into light again. The output light from the II is converted into an electric signal at the CCD. Thus, the photodetection with high sensitivity is also realized at the I-CCD by the signal amplification at an electrical step.

Photodetection method in which light intensity is converted into electric current by means of the photodetector device as described above is broadly used. This light detecting method is called "a direct detection method". In the direct detection method, thermal noise, electric amplification noise or excessive noises are the main factor for noise. These noises are greater than shot noise, and therefore, photodetection with ultimately high sensitivity is considerably difficult.

As one of techniques that allows photodetection at high speed and with high sensitivity, optical heterodyne detection technique is broadly used. The conventional optical heterodyne detection technique is a photodetection method in which interference effect with the local light (local oscillation) having an optical frequency slightly different from that of the light to be detected is used and the light is detected with high sensitivity by sufficiently increased intensity of the local light. If the local light has sufficient intensity, ideal photodetection of a shot noise limit is possible by using a high speed electric circuit, and thus, both high speed and high intensity of the photodetection are realized. In this case, for the signal light and the local light, light in temporally and spatially stable interference condition is generally used.

As a method for temporally stabilizing the interference condition, the following two methods are mainly used. In the first method, an output from the same light source is demultiplexed and each demultiplexed light is used for the signal light and the local light. In this case, due to the demultiplex of the output from the same light source, relative delay time until the signal light and the local light are multiplexed is shorter than the coherence time of the light source. Thereby, the interference condition between the signal light and the local light are temporally stabilized. The light frequencies of the signal light and the local light are configured to be slightly different by using an optical frequency shifter and the like. This method has been used for a long time, since the stable interference condition can be realized relatively easily (See, for example, Patent document 1.).

In the second method, two independent light sources are used, in which the line width of the optical spectrum is significantly narrow (purity of optical spectrum is very high) and the optical frequency is stabilized with high precision. Here, the line width of the optical spectrum is smaller than the bandwidth of the electric circuit part including the photoelectric conversion part. The two independent light sources are used for the signal light or the local light, respectively. In this case, the optical frequencies of the signal light and the local light are configured to be slightly different. Conventionally, this method has been realized only with difficulty due to the technical restriction. However, due to the recent technical development, the purity of the optical spectrum is so high that the line width of the optical spectrum is in a range of kHz and a laser having optical frequency stabilized with high precision is available, so that a relatively stable interference condition can be also obtained at present by using the second method.

It is necessary to use light with high spatial coherence for each of the signal light and the local light, and spatial mode distribution should correspond to each other in order to stabilize the spatial interference condition. For this reason, a spatial mode filter such as a confocal optical system or an optical fiber is used on the signal light path. Thereby, only the signal light component keeping an interference condition spatially stable can be extracted. Consequently, the interference condition is spatially stabilized.

Patent document 1: JP 2890309

DISCLOSURE OF THE INVENTION

However, it is often the case that the signal light detected by the biological observation, sensor, security or laser radar and the like does not have such high temporal coherence as laser light, but coherence is low, that is to say, the line width of the optical spectrum is broad. Even in a case in which a laser light is used in spectrometry and the like, an attempt is made to intentionally broaden the line width of the optical spectrum, in particular to measure a scattering medium. In spectrometry and the like, optical frequency accuracy is secured to some extent, and laser light with a line width of an optical spectrum avoiding influence of the speckle is used.

According to the invention, for the heterodyne detection of the signal light having the low temporally coherence, the source of the signal light and the local light has to be the same and the detection has to take place when the relative delay time of the signal light and the local light is shorter than the coherence time.

If the light has, for example, a center optical frequency of 600 THz (wavelength of 500 nm) and the line width of the optical spectrum of 12 THz (wavelength width of approximately 100 nm), the coherence time is approximately $1.0 \times 10^{-14}$ seconds (corresponding to a spatial distance of approximately $3.0 \times 10^{-6}$ m in vacuum), and the allowed delay time between the signal light and the local light is significantly short.

Considering a case in which the laser light has an optical spectrum with the intentionally broadened line width of 120 GHz, the coherence time is $1.0 \times 10^{-11}$ seconds (corresponding to a spatial distance of approximately $3.0 \times 10^{-3}$ m in vacuum) and the allowed relative delay time is again short.

Thus, tolerance of the time and the distance is small in a situation in which the allowed relative delay time is short, so that applications of the heterodyne detection are strictly limited.

If the signal light (the light to be detected) is a temporally low coherence light newly generated in the sample, such as fluorescence, the local light appropriate for the high-sensitivity heterodyne detection is prepared.

For the reasons above, if the light signal with temporally low coherence is detected in the heterodyne detection, it is not possible to keep the interference condition stable and thus, it is difficult to realize the photodetection at high speed and with the high sensitivity.

Thus, an object of the present invention, which has been made in view of such circumstances, is to provide a photodetector device and a photodetection method as well as a microscope and an endoscope allowing the heterodyne detection of a desired light to be detected with high sensitivity and at high SN (Signal to Noise) ratio.

Furthermore, another problem to be solved by the invention is to provide a photodetector device and a photodetection method as well as a microscope and an endoscope allowing the heterodyne detection of a light having even a broad wavelength band with high sensitivity and at high SN (Signal to Noise) ratio.

Moreover, another problem to be solved by the invention is to provide a photodetector device and a photodetection method as well as a microscope and an endoscope allowing the heterodyne detection of the light even under a temporally and spatially unstable interference condition between the signal light and the local light with high sensitivity and at high SN (Signal to Noise) ratio.

The first aspect of the invention, which achieves the object described above, is a photodetector device, comprising:

a local light emitting unit for generating a local light in temporally unstable interference condition with a light to be detected; and a photoelectric conversion unit for generating beat signals between the local light and the light to be detected by photoelectric conversion, wherein the light is detected in heterodyne detection based on an output of the photoelectric conversion unit.

Here, it is explained what is meant by "a local light in temporally unstable interference condition with a light to be detected" as described above. Now, two different cases are to be explained, respectively: In the first case, the local light is generated from the same light source as the light to be detected. In the second case, the local light and the light to be detected are generated from independent light sources.

Firstly, in the case in which the local light is generated from the same light source as the light to be detected, an output from the same light source is demultiplexed and each demultiplexed light is used for the signal light and the local light. The light generated by reflection, transmission, scattering, refraction, diffraction and the like on a sample is used for the signal light to be detected, which is multiplexed with the local light again to be detected in the heterodyne detection. Then, the local light under the condition in which the relative delay time until the light is demultiplexed and multiplexed again is longer than the coherence time $\tau_c$ is defined as "a local light in temporally unstable interference condition with a light to be detected". Here, coherence time $\tau_c$ is time defined according to the following formula:

$$\tau_c = \frac{2\ln 2}{c\pi}\left(\frac{\lambda_0^2}{\Delta\lambda}\right) \quad (1)$$

wherein, c is speed of light, $\lambda_0$ is a center wavelength of light generated at the light source, and $\Delta\lambda$ is a line width of the wavelength of the light generated at the light source.

Secondly, in the case in which the local light and the light to be detected are generated from independent light sources, "a local light in temporally unstable interference condition with a light to be detected" is the local light having the line width of the optical spectrum greater than the bandwidth of the electric circuit part including the photoelectric conversion part upon heterodyne detection. Here, wavelength drift and the like are included in the line width of the optical spectrum.

The second aspect of the invention resides in the photodetector device according to the first aspect, wherein balanced detection is performed by the photoelectric conversion unit.

The third aspect of the invention resides in the photodetector device according to the first aspect, wherein the local light emitting unit comprises a plurality of light sources.

The fourth aspect of the invention resides in the photodetector device according to the first aspect, wherein the local light emitting unit comprises a light filtering unit for selecting a defined optical frequency component.

The fifth aspect of the invention resides in the photodetector device according to the first aspect, wherein the local light emitting unit comprises an optical spectrum shaping unit for shaping an optical spectrum to a desired form.

The sixth aspect of the invention resides in the photodetector device according to the first aspect, wherein the local light emitting unit comprises a fluorescence emitting unit.

The seventh aspect of the invention resides in the photodetector device according to the first aspect, wherein a spatial filtering unit for selecting only the light with desired spatial distribution is provided upstream of the photoelectric conversion unit.

The eighth aspect of the invention resides in the photodetector device according to the first aspect, wherein a spatial light homogenizer for homogenizing spatial distribution of the light intensity is provided upstream of the photoelectric conversion unit.

The ninth aspect of the invention resides in the photodetector device according to the first aspect, wherein an envelope detection unit for detecting an envelope of an output of the photoelectric conversion unit is provided.

The tenth aspect of the invention resides in the photodetector device according to the first aspect, wherein the light to be detected and the local light are divided from an output of the same light source and a relative delay time between the light to be detected and the local light upon incidence on the photoelectric conversion unit is longer than coherence time.

The eleventh aspect of the invention resides in the photodetector device according to the first aspect, wherein the optical spectrum line width of the local light is broader than the signal processing bandwidth after the photoelectric conversion unit.

The twelfth aspect of the invention, which achieves the object described above, is a photodetection method, comprising:

generating a local light having a broader spectrum line width than a bandwidth of a detection system and temporally unstable interference condition with the light to be detected; and generating beat signals between the local light and the light to be detected by photoelectric conversion, wherein the light is detected in heterodyne detection based on an output of the photoelectric conversion unit.

The thirteenth aspect of the invention resides in the photodetection method according to the twelfth aspect, comprising: performing a balanced detection in the photoelectric conversion step.

The fourteenth aspect of the invention, which achieves the object described above, is a microscope, comprising a photodetector device according to the first aspect for detecting light from an observation sample, wherein the light from the observation sample is detected in heterodyne detection.

The fifteenth aspect of the invention, which achieves the object described above, is an endoscope, comprising a photodetector device according to the first aspect for detecting light from a body cavity to observe the body cavity, wherein the light from the body cavity is detected in heterodyne detection.

The sixteenth aspect of the invention, which achieves the object described above, is an endoscope for detecting light from a body cavity to observe the body cavity, comprising:

a light generating unit for generating irradiation light;

a scanning unit for scanning irradiation light on a sample;

a light transmitting optical system for transmitting light transmitted, reflected, scattered, refracted or diffracted on the sample; and a photodetector device according to the first aspect, wherein the light from the body cavity is detected in heterodyne detection by the photodetector device.

In the photodetector device or the photodetection method of the invention, a plurality of beat signals are generated from the local light in temporally unstable interference condition with a light to be detected and the light to be detected, which then are added and the light is detected in heterodyne detection. Thereby, it is possible to detect a desired light with high sensitivity and at a high SN ratio even in a test sample in which the light to be detected is scattered on the scattering body such as a biological body, or in which the light to be detected is significantly reduced under the influence of absorption and the like. Moreover, it is also possible to detect a light from a material to be detected, which exists deep within an object to be detected or at a distance or a light from a material to be examined, which exists in an environment where other light absorbing materials are present, with high sensitivity and at a high SN ratio.

In the photodetector device or the photodetection method of the invention, unlike the conventional detector or the photodetection method, it is not necessary that the relative delay time between the detected signal light and the local light is shorter than the coherence time $\tau_c$, and thus, an adjustment of the relative delay time of the photodetection is omitted. Light sources with low cost such as a LED (Light Emitting Diode) or a SLD (Super Luminescent Diode) can be used, since the optical spectrum of the local light can be broad if the light to be detected and the local light are generated from different light sources. These effects are industrially significant.

In the microscope according to the invention, beat signals between the light from the observation sample and the local light in temporally unstable interference condition with the light to be detected are detected in the photodetector device, so that the sample can be observed with high sensitivity and at a high SN ratio.

In the microscope according to the invention, beat signals between the light from the body cavity and the local light in temporally unstable interference condition with the light to be detected are detected in the photodetector device, the body cavity can be observed with high sensitivity and at a high SN ratio.

DESCRIPTION OF THE PREFERRED EMBODIMENTS

Embodiments of the present invention will be now described with reference to the accompanying drawings.

First Embodiment

Figure 1:
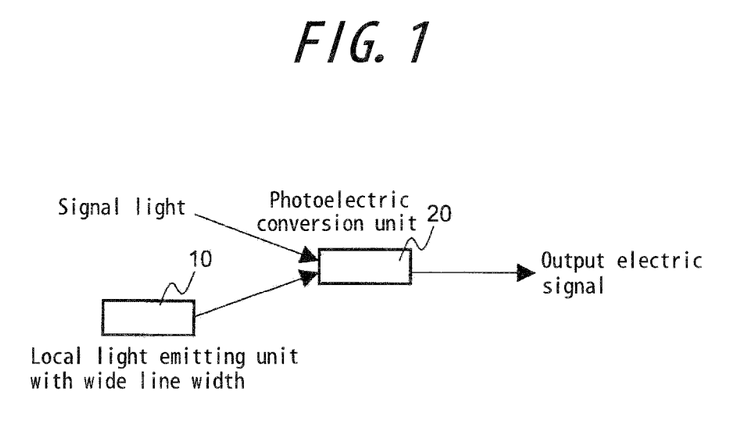
FIG. 1 is a block diagram showing a basic configuration of photodetector device according to the first embodiment of the invention.

FIG. 1 is a block diagram showing a basic configuration of a photodetector device according to the first embodiment of the invention. In the photodetector device, a local light emitting unit 10 is used to emit a local light in temporally unstable interference condition with the light to be detected to convert the local light from the local light emitting unit 10 and the light to be detected into electric signals at a photoelectric conversion unit 20. A signal, to which a plurality of beat signals due to the local light and the light to be detected is added, is obtained from the photoelectric conversion unit 20 for heterodyne detection of input signal light.

For example, LED, SLD, SOA (Semiconductor Optical Amplifier) generating spontaneous emission or fluorescence is used to form the local light emitting unit 10. The local light emitting unit 10 can be formed by a different light source from that of the light to be detected. A part of illumination light can be used to form the local light emitting unit 10 as described below. If the illumination light transmitted, reflected or scatter at an object, is used for the light to be detected, the detection is possible by inserting relative delay longer than a coherence time of the illumination light between a part of the illumination light used for the local light and the light to be detected. For example, PMT, APD, PD, CCD, CMOS, EM-CCD or EB-CCD and the like are used to form the photoelectric conversion unit 20. If the light to be detected and the local light are incident on the photoelectric conversion unit, an optical element such as a beam splitter or an optical fiber coupler is arranged directly upstream of the photoelectric conversion unit 20 for multiplexing of the light to be detected and the local light, which can be then incident on the photoelectric conversion unit 20 to obtain beat signals, or both the light to be detected and the local light can be incident on the light receiving surface of the photoelectric conversion unit 20.

In particular, amplitude or intensity data of the signals output from the photoelectric conversion unit 20 is used to detect the signal light, which is the light to be detected. These data is acquired by envelope detection or square-law detection. A filtering unit for eliminating a direct current component can be provided downstream of the photoelectric conversion unit 20. An adjustment of the intensity of the local light is possible by adjusting the intensity of the beat signals.

Second Embodiment

Figure 2:
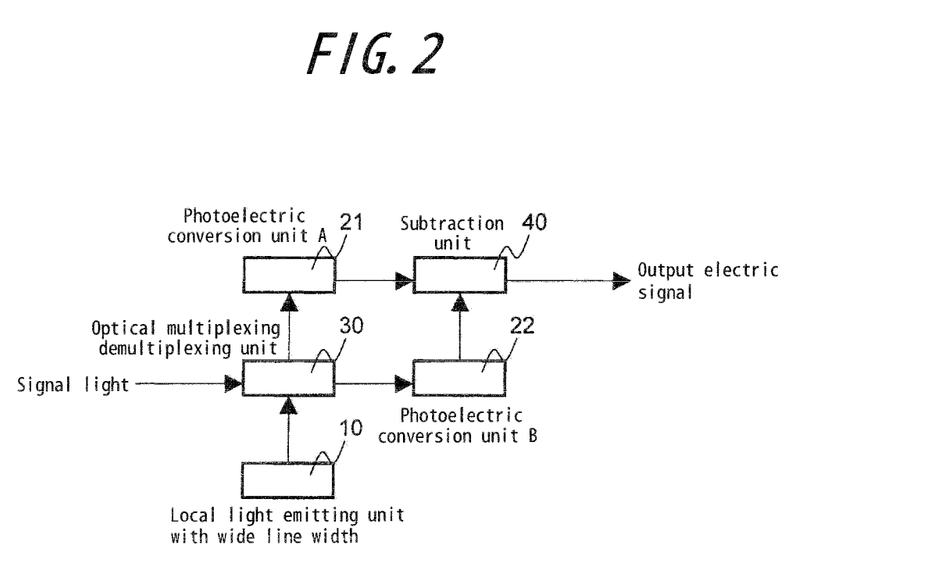
FIG. 2 is a block diagram showing a basic configuration of photodetector device according to the second embodiment of the invention.

FIG. 2 shows a configuration of balanced detection. The signal light is divided into two branches by an optical multiplexing/demultiplexing unit 30, and the light of one branch is incident on a photoelectric conversion unit (A) 21 and the light of the other branch is incident on a photoelectric conversion unit (B) 22. Electric signals output from the photoelectric conversion unit (A) 20 and the photoelectric conversion unit (B) 20 are input into the subtraction unit 40. For the subtraction unit 40, for example, an analog differential amplifier circuit, digital differential amplifier circuit and signal processing by means of software and the like can be used. A beat signal between signal lights (referred to as "signal-signal beat" below), the beat signal between the local lights (referred to as "local-local beat" below) and the beat signal between the signal light and the local light (referred to as "signal-local beat" below) are detected, respectively, on the photoelectric conversion unit (A) 21 and the photoelectric conversion unit (B) 22. On one hand, the signal-signal beat and the local-local beat are compensated at the subtraction unit 40, since the beat signals with the same phase is detected on the photoelectric conversion unit (A) 21 and the photoelectric conversion unit (B) 22. On the other hand, signal-local beat output from the photoelectric conversion unit (A) 21 and the photoelectric conversion unit (B) 22 are inversed in their phase, so that they are added at the subtraction unit 40. Therefore, the balanced detection configuration as shown in FIG. 2 is used to eliminate the signal-signal beat and the local-local beat, which are background signals upon photodetection and thus, photo detection with high SN ratio is possible. Furthermore, the balanced detection configuration as shown in FIG. 2 can be used to reduce relative intensity noise (RIN) contained in the local light itself.

Figure 3:
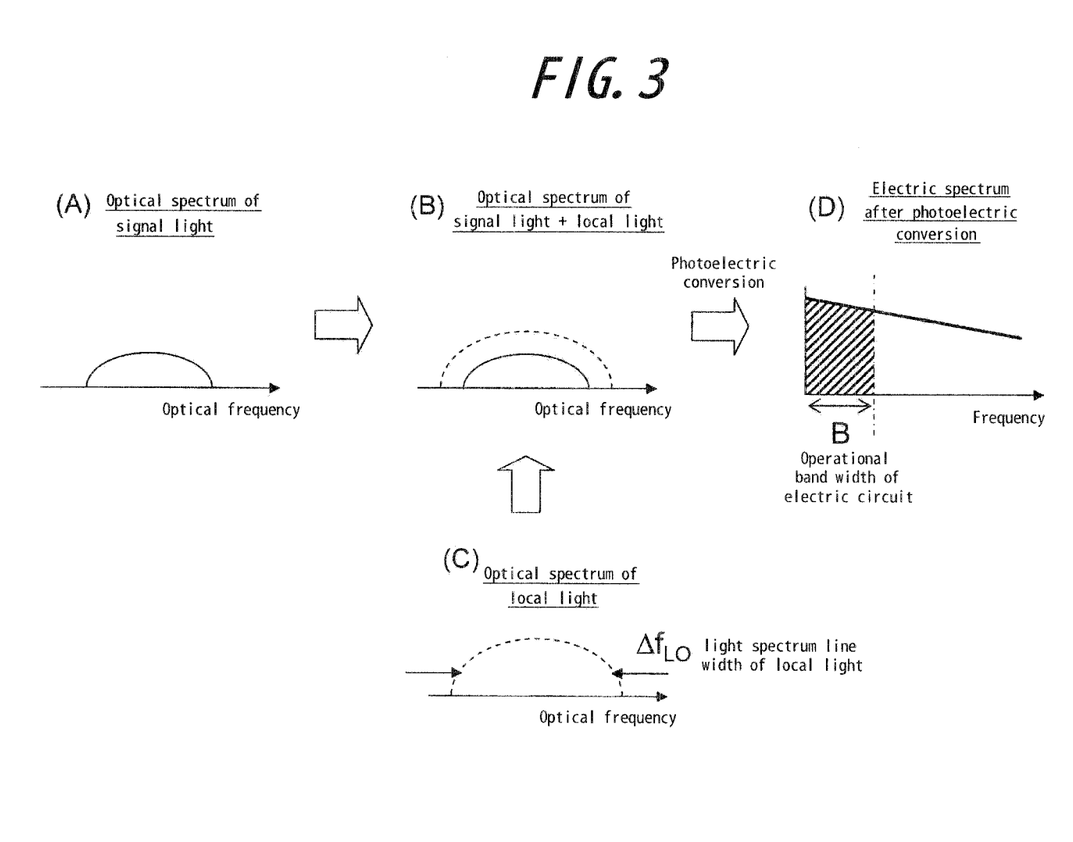
FIG. 3 is a schematic view showing the operation of the photodetector device shown in FIG. 2.

FIG. 3 shows a schematic view showing operation of the photodetector device shown in FIG. 2 on a frequency axis. (A), (B), (C) and (D) in FIG. 3 show an optical spectrum of the signal light, an optical spectrum upon overlapping of the signal light and the local light, an optical spectrum of the local light, and an electromagnetic spectrum after the photoelectric conversion, respectively. Optical spectrum line width $\Delta f_{LO}$ of the local light, and bandwidth B of the electric circuit downstream of the photoelectric conversion unit 20 are shown. In FIG. 3, the optical spectrum line width $\Delta f_{LO}$ is broader than the optical spectrum width of the signal light, and broader than the bandwidth B. The optical spectrum of the local light is partly overlapped with the optical spectrum of the signal light on the optical frequency axis and the intensity of the local light is sufficiently high relative to the signal light.

The signal light as well as the local light have a plurality of optical frequencies in the example shown in FIG. 3 and thus, signal-local beat in combination of any light frequencies is detected within the bandwidth B of the electric circuit. A lot of the same signal-local beat in different combination of different optical frequencies are also detected, but they are incoherently added, since they are uncorrelated.

Figure 4:
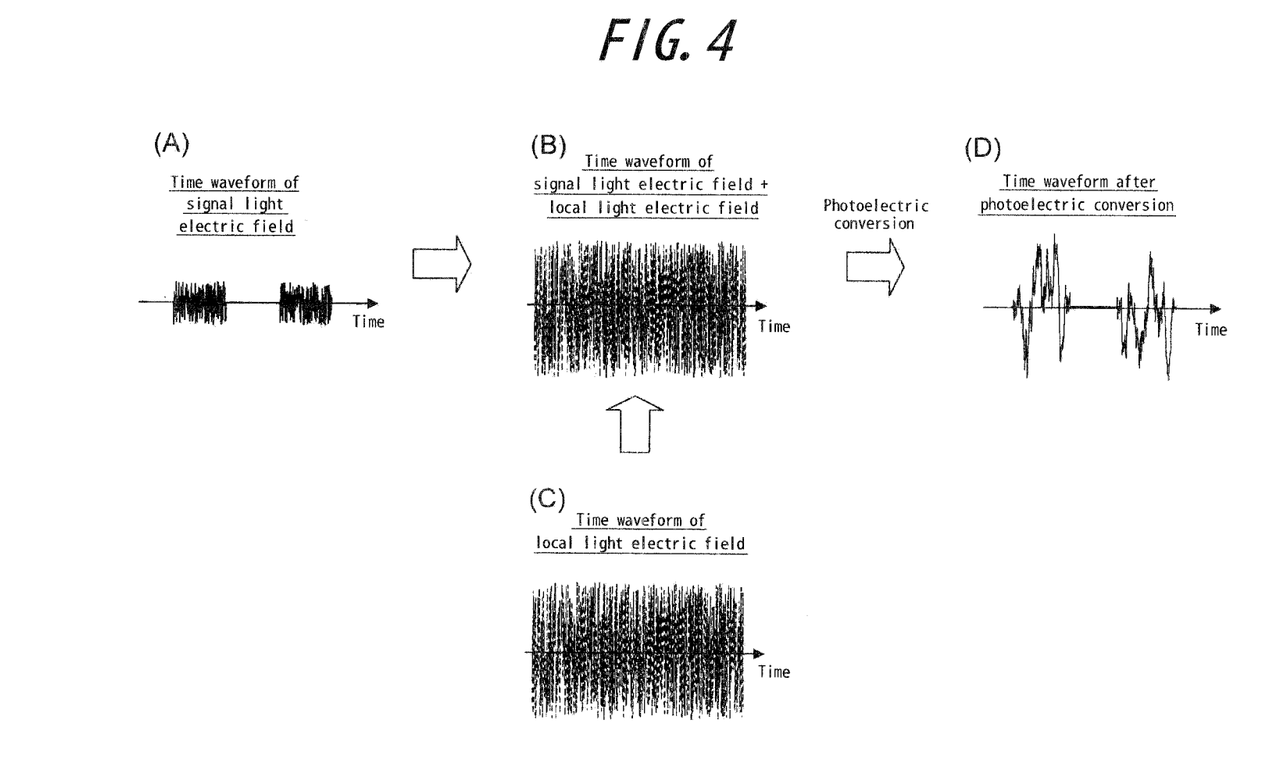
FIG. 4 is a schematic view showing the operation of the photodetector device shown in FIG. 2.

FIG. 4 is a schematic view showing operation of the photodetector device on a time axis. FIGS. 4 (A), (B), (C) and (D) show a time waveform of signal light electric field, a time waveform upon overlapping of the signal light electric field and local light electric field, a temporal waveform of the local light electric field and a time waveform after photoelectric conversion. Similar to the example in FIG. 3, $\Delta f_{LO}$ is broader than B and the optical spectrum of the local light is partly overlapped with the optical spectrum of the signal light on the optical frequency axis and intensity of the local light is sufficiently high relative to the signal light. The signal shown in FIG. 4 (D) is obtained when electric field of the signal light and electric field of the local light are temporally and spatially overlapped. The signal light and the local light are uncorrelated, so that the temporal waveform of the detected signal is noisy as shown in FIG. 4 (D). Envelope detection or square-law detection can be used to detect the noisy signal.

Third Embodiment

Figure 5:
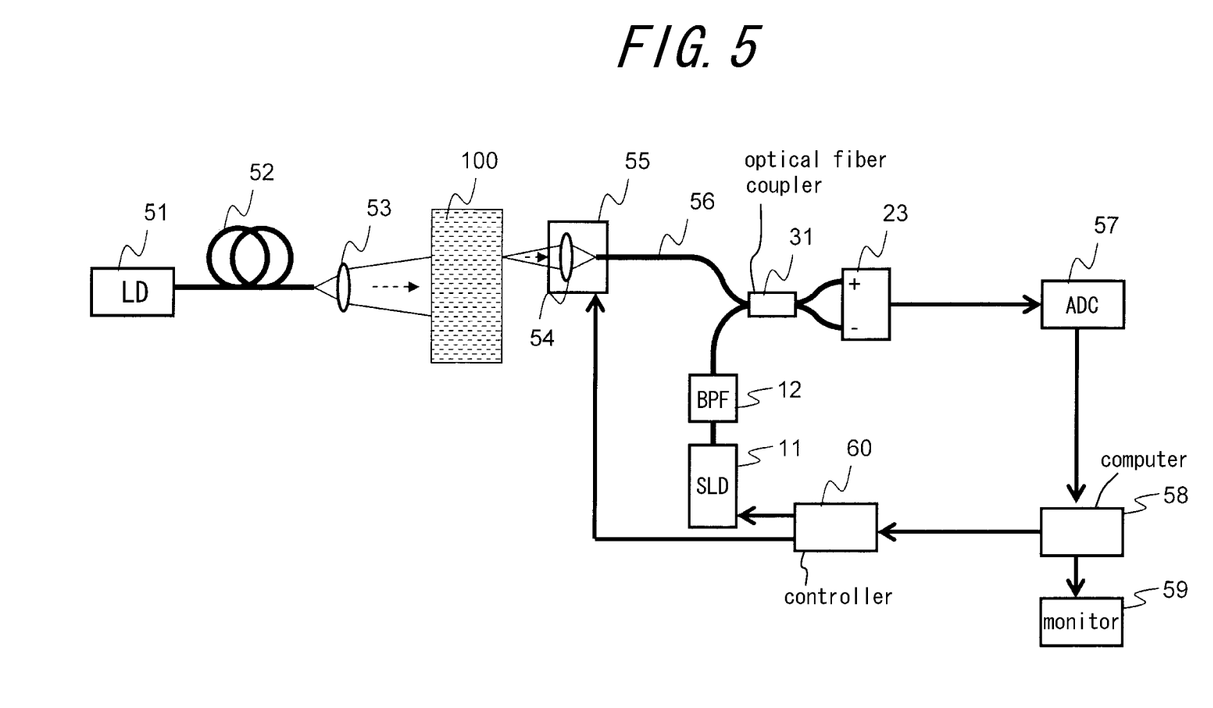
FIG. 5 is a block diagram showing a basic configuration of photodetector device according to the third embodiment of the invention

FIG. 5 is a block diagram showing a configuration of the main part of a vital observation apparatus according to the third embodiment of the invention. The vital observation apparatus used in this embodiment comprises a semiconductor laser (laser diode: LD) 51 which emits light at center wavelength of 940 nm as an illumination light source. The light emitted from the LD 51 is coupled into optical fiber 52 to irradiate a biological tissue 100 via lens 53. The light transmitted the biological tissue 100 is the signal light to be detected. The light transmitted the biological tissue 100 is collected by a lens 54 and input into a Single Mode Fiber (SMF) 56. The lens 54 is supported by a movable table 55. The output light from the SMF 56 is coupled to an input port of an optical fiber coupler 31 having two input ports and two output ports. The local light is input into another input port of the optical fiber coupler 31. For a light source of the local light, the SLD 11 with a wavelength range of 940 nm is used.

A BPF (Bandpass filter) 12 having a center wavelength of 940 nm and a transmission bandwidth of 2 nm is arranged downstream of the SLD 11 and the light output form the BPF 12 is used for the local light. In this case, the transmission center wavelength of the BPF 12 is adjusted, so that the wavelength of the detected signal light is contained in the wavelength range of the local light. The two output ports of the optical fiber coupler 31 are connected to a DBD (Dual balance detector) 23. The DBD 23 comprising 2 InGaAs photodiodes as photoelectric conversion unit (A) 21 and photoelectric conversion unit (B) 21 and an analog differential amplifier circuit as a subtraction unit 40 and having the bandwidth of 200 MHz. The output of the DBD 23 is input into an Analog-to-digital converter (ADC) 57 with 16 bit and an analog input signal is converted into a digital signal. Then, a digital signal output from ADC 57 is input into a computer 58. Envelope curve of the input signal from ADC 57 is calculated and the integration value for a waveform of the envelope over a defined time is calculated. A controller 60 controls the strength of the SLD 11 and the position of the movable table 55. The movable table 55 is held in the same position over a defined time T and the integration value for the waveform of the envelope with respect to the position of the movable table 55 is stored in the computer 58 and displayed on a monitor 59 as a two-dimensional image.

Thus, biological body scattering light with high intensity can be observed from within with high speed and high SN ratio.

Fourth Embodiment

Figure 6:
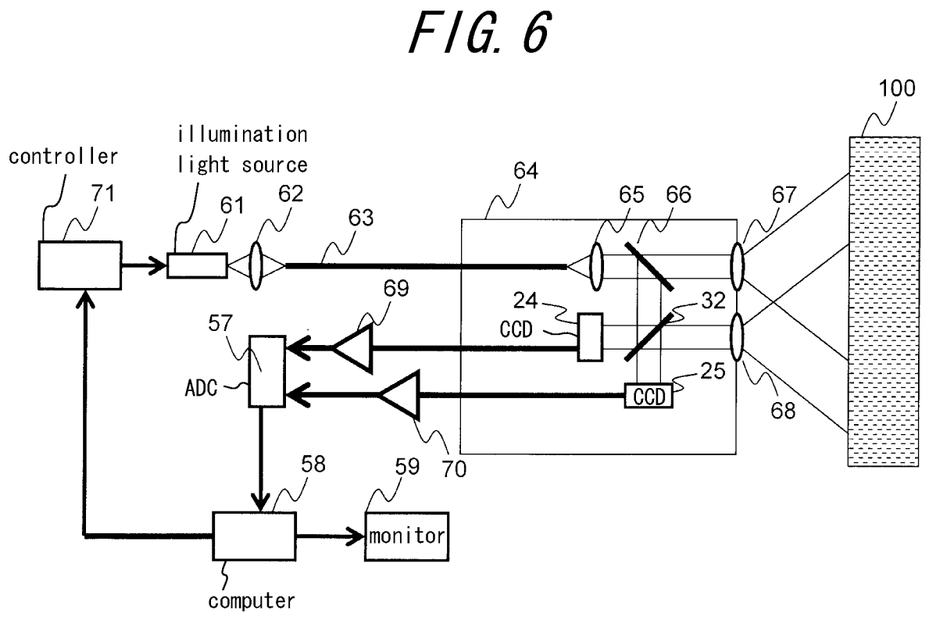
FIG. 6 is a block diagram showing a basic configuration of photodetector device according to the fourth embodiment of the invention FIG. 7 a block diagram showing a basic configuration of photodetector device according to the fifth embodiment of the invention FIG. 8 a block diagram showing a basic configuration of photodetector device according to the sixth embodiment of the invention FIG. 9 a block diagram showing a basic configuration of photodetector device according to the seventh embodiment of the invention FIG. 10 a block diagram showing a basic configuration of photodetector device according to the eighth embodiment of the invention.

FIG. 6 is a block diagram showing a configuration of the main part of an endoscope according to the fourth embodiment of the invention. The endoscope is configured to observe body cavities and formed as a photodetector device shown in FIG. 2 serving as a detection system of the light to be detected. As shown in FIG. 6, an illumination light source 61 includes Xe lamp and is driven by a controller 71 controlled by the computer 58. The light emitted from the illumination light source 61 is input into an LGF (Light guide fiber) 63 via lens 62.

The LGF 63 is arranged to go through the endoscope housing 64. The light transmitted the LGF 63 is emitted into a space via an optical lens system 65 provided in the endoscope housing 64. The emitted light is also divided into two branches by a beam splitter 66, and one branch is incident on the biological tissue 100 via an optical lens system 67 and the other branch is input into a half-mirror 32. The light input into the half-mirror 32 is used for the local light upon photodetection. Reflected light or scattered light from the biological tissue 100 is collected by an optical lens system 68 and used for the signal light to be detected. The difference of light path length between the light path (beam splitter 66—optical lens system 67—biological tissue 100—optical lens system 68—half-mirror 32) and the light path (beam splitter 66—half-mirror 32 is configured to be longer than the coherence length of the illumination light source 61.

The half-mirror 32 operates in the same way as the optical fiber coupler 31 shown in FIG. 5, that is to say, serves as an optical multiplexing/demultiplexing unit 30 with two inputs and two outputs. The local light from the beam splitter 66 and the signal light to be detected from the optical lens system 68 are input into the half-mirror 32 and two outputs from the half-mirror 32 are input into CCD (A) 24 as a photoelectric conversion unit (A) 21 and CCD (B) 25 as a photoelectric conversion unit (B) 22, respectively, to be converted into an analog electric signal. The output signals from CCD (A) 24 and CCD (B) 25 are amplified at an amplifier 69 and amplifier 70, respectively, and converted into a digital signal at ADC 57 having two input ports.

The output signal from ADC 57 is input into the computer 58, at which a signal processing for subtraction of the output from CCD (A) 24 and CCD (B) 25 and a signal processing for calculating the envelope after the subtraction and integrating over a defined time. The signal processing of subtraction, the calculation of the envelope and the integration process are performed by the subtraction unit 40 in FIG. 2.

Thus, an endoscopic image can be obtained, while the light intensity of the illumination is kept low. In this way, heat generation at a tip of the endoscope due to the increased intensity of the illumination light is suppressed, so that an endoscopic image can be provided for a patient with high security. Furthermore, it is also advantageous in this embodiment that a light source for the local light can be omitted, so that the simple configuration is obtained.

A wavelength filter transmitting green and red is arranged downstream of the Xe lamp in the illumination light source 61 in FIG. 6 in order to perform an NBI (Narrow band imaging). According to the fourth embodiment shown in FIG. 6, NBI can be performed without degrading the brightness of the image, while reduction of the brightness of the image due to the use of the wavelength band filter is inevitable in the conventional NBI.

In the fourth embodiment, an example using CCD is described for a two-dimensional detector. However, other two-dimensional detectors such as a CMOS, an EM-CCD, an EB-CCD, an I-CCD can be also used for the imaging.

Fifth Embodiment

Figure 7:
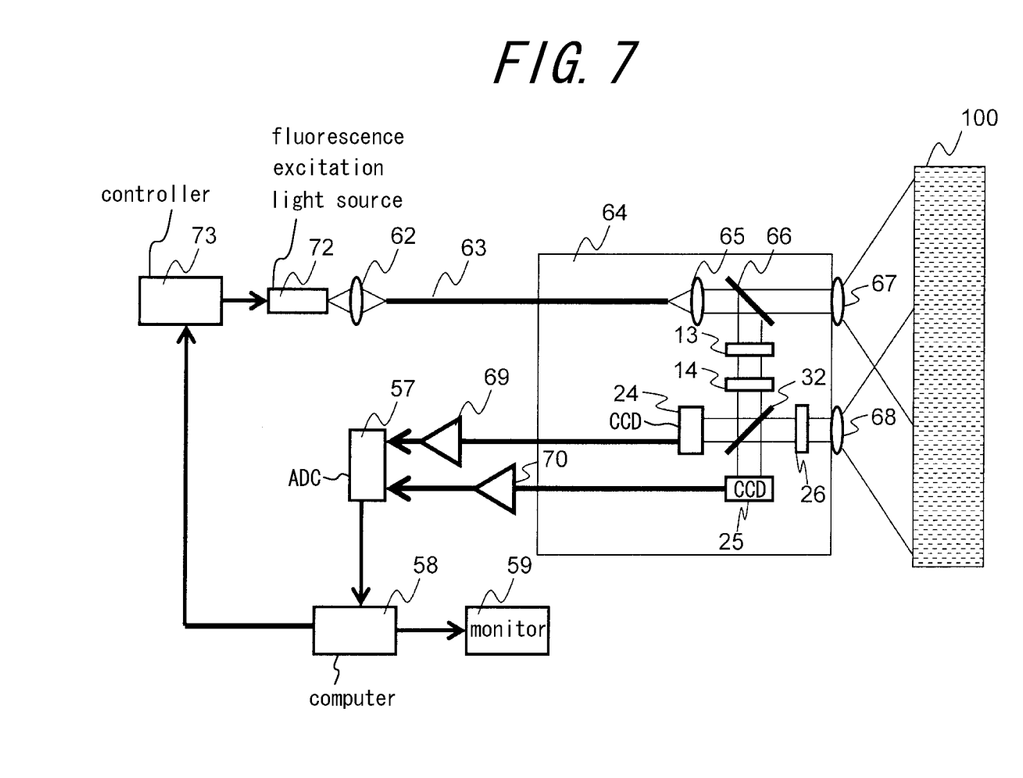

FIG. 7 is a block diagram showing a configuration of the main part of a fluorescence endoscope according to the fifth embodiment of the invention. The fluorescence endoscope is configured to observe body cavities and formed as a photo detection device shown in FIG. 2 as a detection system of the light to be detected. While FIG. 7 is similar to FIG. 6, a light source 72 for exciting fluorescence includes a Xe lamp as well as a wavelength band filter for transmitting only the light in a wavelength range of 450 nm and is driven by a controller 73 controlled by the computer 58. FIG. 7 differs from FIG. 6 in that a fluorescent plate 13 and an optical spectrum shaping filter 14 are interposed between the beam splitter 66 and the half-mirror 32 and a excitation light removal filter 26 are interposed between the optical lens system 68 and the half-mirror 32. The same components as those of FIG. 6 are shown with the same reference symbols and are now further described in detail.

The fluorescent plate 13 emitting fluorescence in the same wavelength range as that of the fluorescence from the biological tissue, for example, the wavelength range of 530 nm is used, if the fluorescence excitation light source 72 is used for the light excitation.

The excitation light removal filter 26 eliminating the light emitted from the fluorescence excitation light source 72 and transmitting only the light in the wavelength of interest emitted from the biological tissue 100, for example, light in the wavelength range of 530 nm, is used.

Thus, it is possible to detect a weak light emitted from the biological body as a brighter light by using such a configuration. In this embodiment, the optical spectrum shaping filter 14 is used and it is thereby possible to adjust wavelength dependence in the photodetection. Moreover, it is possible to adjust the center wavelength of the local light and the wavelength range by changing the fluorescent plate 13. If the wavelength of the light emitted from the fluorescence excitation light source 72 is narrow, the local light corresponding to a wide wavelength band can be generated. It is also effective to use fluorescent plate 13 having a narrow wavelength range of luminescence if it is desired to detect only a defined wavelength range of the luminescence.

Sixth Embodiment

Figure 8:
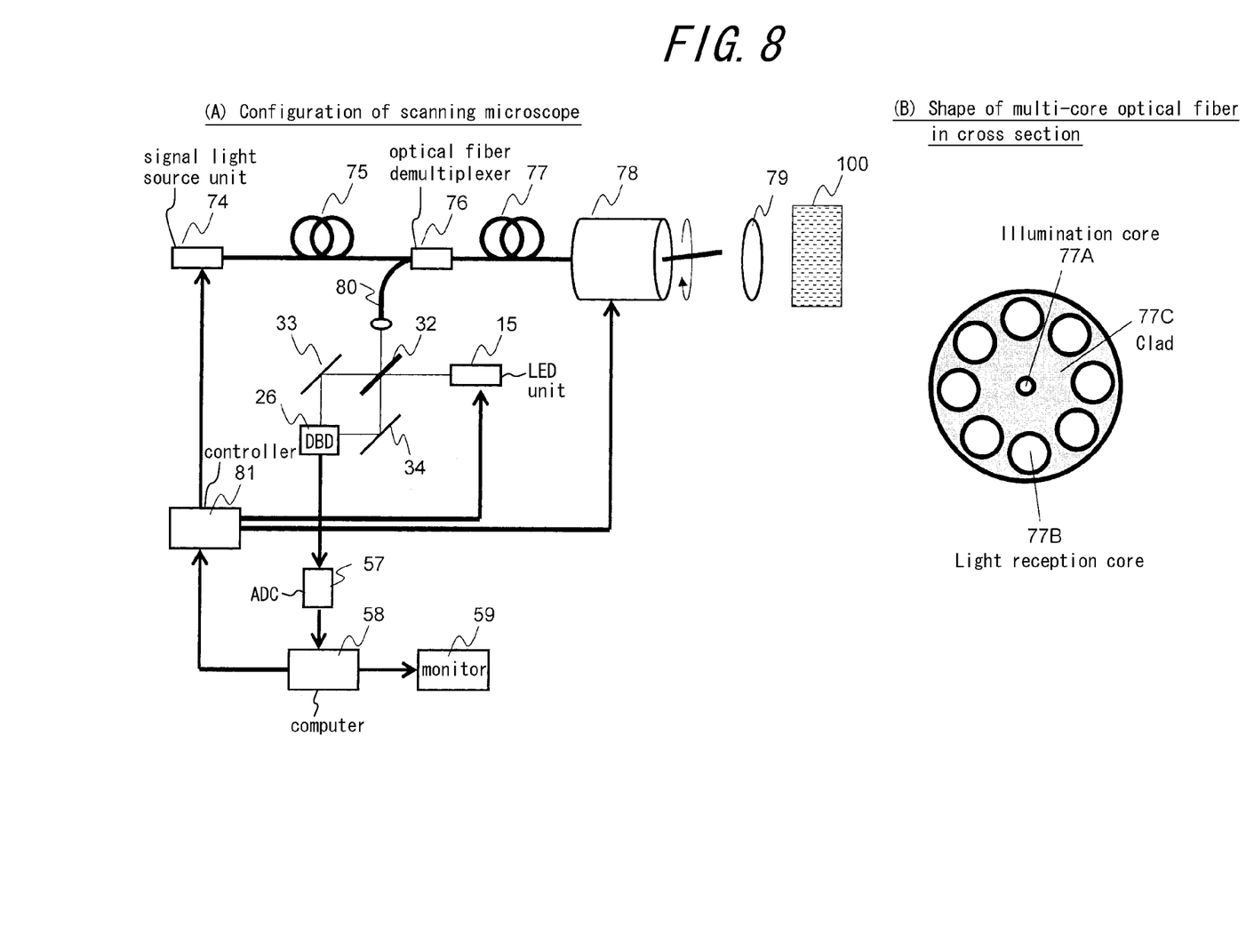

FIG. 8 (A) shows a block diagram showing a configuration of the main part of a fiber scanning endoscope. The endoscope is configured to observe body cavities and formed as a photodetector device shown in FIG. 2 serving as a detection system of the light to be detected.

A signal light source unit 74 including LD having a wavelength of 480 nm, a diode pumped solid sate laser (DPSS) having an oscillation wavelength of 532 nm, LD having a wavelength of 633 nm is used and the output from each laser is multiplexed at a dichroic mirror to be output from the signal light source unit 74. The wavelength and the intensity of the light output from the signal light source unit 74 are controlled at a controller 81.

The output light from the signal light source unit 74 is input into the light fiber 75. The light fiber 75 is coupled to a multi-core optical fiber 77 via an optical fiber demultiplexer 76. The multi-core optical fiber 77 is shown in FIG. 8 (B) in cross section. The multi-core optical fiber 77 comprises on an illumination core 77A, a plurality of light reception cores 77B and a clad 77C. The optical fiber demultiplexer 76 couples the light transmitted by the optical fiber 75 to the illumination core 77A of the multi-core optical fiber 77, and couples the light transmitted by the light reception cores 77B in the multi-core optical fiber 77 to a multimode optical fiber 80.

The light output from the signal light source 74 is transmitted the optical fiber 75 and is coupled to the illumination core 77A of the multi-core optical fiber 77. A tip of the multi-core optical fiber 77 is held by a drive mechanism 78. The drive mechanism 78 comprises a piezo element and the like and is driven such that a direction of an incident light from the tip of the illumination core 77A is controlled in response to the signal from a controller 81. The biological tissue 100 is irradiated with the light emitted from the illumination core 77A of the multi-core optical fiber 77 via an optical lens system 79 such as a gradient refractive index (GRIN) lens.

The light reflected or scattered at the biological tissue 100 is coupled to the plurality of the light reception cores 77B of the multi-core optical fiber 77 via the optical lens system 79. The reflected or scattered light from the biological tissue 100 transmitted the light reception cores 77B of the multi-core optical fiber 77 is used as a signal light to be detected. The signal light to be detected, which is transmitted the light reception cores 77B of the multi-core optical fiber 77 is coupled to the multimode optical fiber 80 by the optical fiber demultiplexer 76.

The light output from an LED unit 15 is used as a local light. The LED unit 15 includes LED having a wavelength range of 480 nm, 532 nm and 633 nm, and the output light from the LED is multiplexed at the dichroic mirror. The wavelength and the intensity of the light output from the LED unit 15 are controlled at the controller 81.

The light to be detected output from the multimode optical fiber 80 and the local light output from the LED unit 15 are multiplexed or demultiplexed at the half-mirror 32 in the same way as the fourth embodiment. The light multiplexed or demultiplexed at the half-mirror 32 is input into a DBD 26 via a mirror 33 or a mirror 34, respectively. The DBD 26 used in this embodiment comprises two photodiodes for the photoelectric conversion unit (A) 21 and the photoelectric conversion unit (B) 22 as well as the analog differential amplifier electronic circuit for the subtraction unit 40 and having a bandwidth of 200 MHz. The ADC 57, the computer 58 and the monitor 59 operate in the same way as described with respect to FIG. 5 and thus, are not further described in detail.

According to this embodiment, a plurality of light sources having a different wavelength are used for the local light, so that light in various wavelength ranges can be advantageously detected. A plurality of light sources light having a different wavelength ranges are used for the local to allow high-sensitivity detection even though a wavelength range of the light to be detected is wide.

Seventh Embodiment

Figure 9:
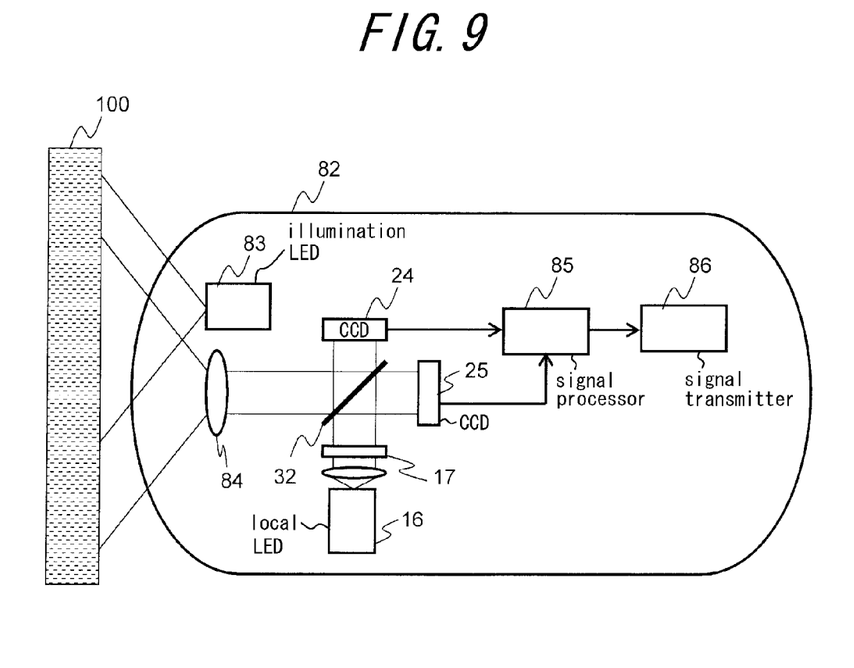

FIG. 9 is a block diagram showing a configuration of the main part of a capsule endoscope according to the seventh embodiment. The endoscope is configured to observe body cavities and formed as a photodetector device shown in FIG. 2 serving as a detection system of the light to be detected.

An Illumination LED 83, a condenser lens system 84, a half-mirror 32, CCD (A) 24, CCD (B) 25, a local light LED 16, homogenizer 17, a signal processor 85 and a signal transmitter 86 are accommodated in the capsule enclosure 82.

The illumination LED 83 emitting white light is used. The biological tissue 10 is irradiated with light emitted from the illumination LED 83 outside of the capsule enclosure 82. The illumination light reflected or scattered light at the biological tissue 100 is collected at the light condenser lens system 84 in the capsule enclosure 82 and used as a signal light to be detected.

The local light LED 16 emitting white light is used for a light source of the local light. A homogenized spatial pattern of the local LED 16 is output from the homogenizer 17. The light output from the homogenizer 17 is used as the local light.

The detected signal light collected at the condenser lens system 84 and the local light emitted from the homogenizer 17 is incident on the half-mirror 32. The half-mirror 32, CCD (A) 24, and CCD (B) 25 operate in the same way as those of the forth embodiment shown in FIG. 6 and thus, are not further described.

An analog output signal from the CCD (A) 24 and the CCD (B) 25 is input into the signal processor 85 and converted into a digital signal. Thereafter, calculation for the envelope detection is performed in the signal processor 85 and the digital signal is output from the signal processor 85. The output of the signal processor 85 is subsequently input into the signal transmitter 86. The signal transmitter 86 transmits the input digital signal to the outside of the capsule enclosure 82 via wireless transmission.

In this embodiment, a homogenizer 17 is used downstream of the local LED 16. In general, a spatial output pattern of the LED is extremely inhomogeneous and thus, the dependence on the spatial position of the heterodyne detection sensitivity, that is, image variations can occur. Therefore, the spatial output pattern of the local light is homogenized by the homogenizer 17 arranged downstream of the local LED 16.

In the seventh embodiment, an example of a two-dimensional detector using CCD is described. However, other tow-dimensional detector such as CMOS, EM-CCD, EB-CCD, I-CCD can be also used for imaging.

Eighth Embodiment

Figure 10:
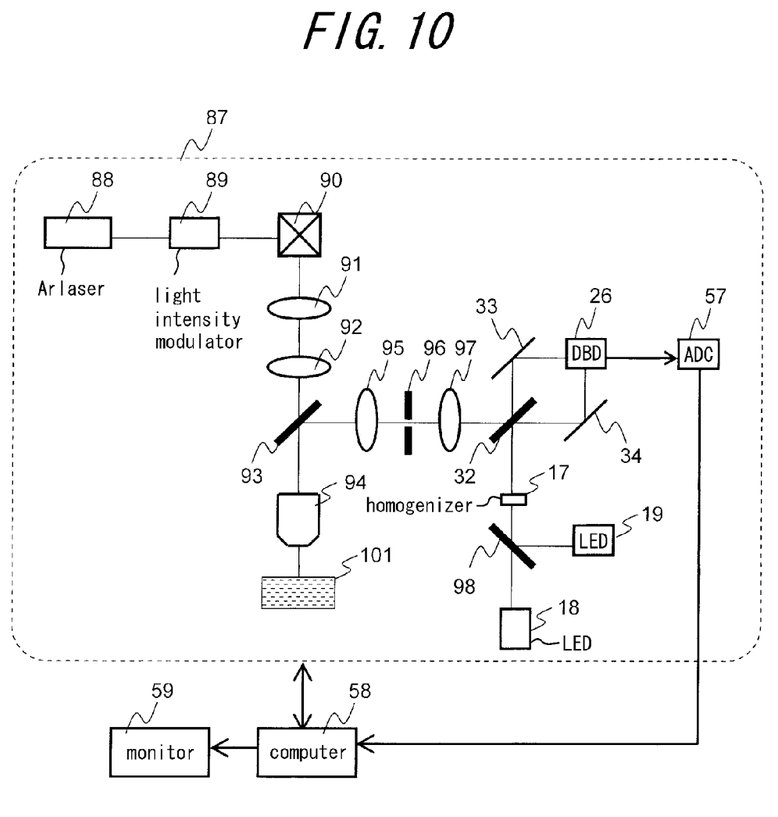

FIG. 10 shows a block diagram of a configuration of the main part of a laser scanning fluorescence microscope 87 according to the invention. The laser scanning fluorescence microscope 87 comprise an Ar laser 88 continuously generating light at a wavelength of 488 nm as an excitation light source. In FIG. 10, the light intensity of a laser beam emitted from the Ar laser 88 is modulated at a light intensity modulator 89 such as acousto-optic modulator (AOM), collected and irradiated on a living cell sample 101 to be examined via a X-Y galvanomirror 90, a pupil projection lens 91, an imaging lens 92, a dichroic mirror 93 and an objective lens 94. Thus, a light irradiation unit irradiating an excitation light on the sample from the excitation light source is formed by the X-Y galvanomirror 90, the pupil projection lens 91, the imaging lens 92, the dichroic mirror 93 and the objective lens 94. A light canning unit is formed by the X-Y galvanomirror 90.

The object to be examined, which is stained by fluorescent dye or which is developing fluorescent protein is used for the living cell sample 101. Here, a material of the object to be examined, which is developing enhanced green fluorescent protein (eGFP) is used. Thereby, eGEP is excited and fluorescence having a wavelength of approximately 500 nm-600 nm is generated when the living cell sample 101 is irradiated with the laser light from Ar laser 88.

The fluorescence generated from the living cell sample 101 is directed to the dichroic mirror 93 via the objective lens 94. The dichroic mirror 93 is configured to transmit the light having a wavelength of 488 nm and reflect the light having a wavelength of more than 500 nm. Thereby, the fluorescence having a wavelength of 500 nm-600 nm generated at the living cell sample 101 is reflected at the dichroic mirror 93.

The fluorescence reflected at the dichroic mirror 93 is collected at a lens 95 and a pinhole 96 is arranged in a position of a light collection point. The fluorescence transmitted the pinhole 96 is transformed to a parallel light, which is used for the light signal to be detected and incident on the half-mirror 32.

Output signals from the LED (A) 18 emitting light in a wavelength range of 530 nm and the LED (B) 19 emitting light in a wavelength range of 630 nm are multiplexed at a dichroic mirror 98 and used for the light source of the local light. The light multiplexed at the dichroic mirror 98 is configured to be incident on the half-mirror 32 via the homogenizer 17.

The half-mirror 32, the mirror 33, the mirror 34, the DBD 26, the ADC 57 and the computer 58 have the same functions as those of the sixth embodiment in FIG. 8, and thus are shown with the same reference symbols and are not further explained. However the computer 58 additionally controls the whole laser scanning fluorescence microscope 87. Thereby, the laser beam from the Ar laser 88 is deflected at the X-Y galvanomirror 90 and the living cell sample 101 is scanned in two dimension in a plane perpendicular to the light axis of the objective lens 94, and subsequently, output obtained from the ADC 57 is processed at each scanning point, so that a fluorescence image is displayed on the monitor 59.

Thus, the laser scanning fluorescence microscope according to the embodiment of the invention detects the fluorescence generated from the living cell sample 101 in the heterodyne detection by irradiating the laser beam from Ar laser 88. Accordingly, it is possible to perform fluorescent observation of the living cell sample 101 with high sensitivity and at a high SN ratio, without the living cell sample 101 being irradiated with the laser beam having increased intensity or extending integration time of the light detection even though the fluorescence, which serves as a signal light, obtained form the living cell sample 101 is weak. The number of the LEDs, which serves as the light generating unit, is not limited to two, but can be more than two, depending on the wavelength range of the input signal light to be detected.

The invention is not limited to the embodiments described above, but numerous variations and changes are possible. For example, the signal light to be detected is not limited to the reflected light, the scattered light or the fluorescence, but the photodetector device of the invention can be advantageously used for transmitted light and phosphorescence. While above embodiments are described for a biological sample such as a biological tissue or a living cell, which are a scattering body, the invention can be also applied to various materials to be examined, which exist in the scattering body other than the biological sample. It is also possible to detect a light from a material to be detected, which exists deep within an object to be detected or at a distance (an object to be detected by a radar, a substance in the celestial body, a deep-sea organism or a benthic feeder) or a light from a material to be examined, which exists in an environment where other light absorbing materials are present, with high sensitivity and at a high SN ratio.

The invention can be applied to light detection ranging from ultraviolet rays having a wavelength of approximately 180 nm to infrared rays with a wavelength of approximately 50 μm and is not limited to the detection of visible light as described in the above embodiments. For example, the light of an ultraviolet lamp can be used as a local light for detecting ultraviolet ray. A multilayer mirror can be used to form the light multiplexing unit and, for example, PMT can be used to form photoelectric conversion unit.

For detection of the infrared ray, for example, an infrared lamp can be used as the local light emitting unit. The light multiplexing unit can be formed by unit of a beam splitter with CsI substrate and the photoelectric conversion unit can be formed by unit of photoelectric element using, for example, Ge:Zn.

| REFERENCE NUMERALS | |
|---|---|
| 10 | local light emitting unit |
| 11 | SLD |
| 12 | BPF |
| 13 | fluorescent plate |
| 14 | optical spectrum shaping filter |
| 15 | LED unit |
| 16 | local LED |
| 17 | homogenizer |
| 18 | LED (A) |
| 19 | LED (B) |
| 20 | photoelectric conversion unit |
| 21 | photoelectric conversion unit (A) |
| 22 | photoelectric conversion unit (B) |
| 23 | DBD |
| 24 | CCD (A) |
| 25 | CCD (B) |
| 26 | DBD |
| 30 | optical multiplexing/demultiplexing unit |
| 31 | optical fiber coupler |
| 32 | half-mirror |
| 33 | mirror |
| 34 | mirror |
| 40 | subtraction unit |
| 51 | LD |
| 52 | optical fiber |
| 53 | lens |
| 54 | lens |
| 55 | movable table |
| 56 | SMF |
| 57 | ADC |
| 58 | computer |
| 59 | monitor |
| 60 | controller |

-continued

| REFERENCE NUMERALS | |
|---|---|
| 61 | illumination light source |
| 62 | lens |
| 63 | LGF |
| 64 | endoscope housing |
| 65 | lens optical system |
| 66 | beam splitter |
| 67 | lens optical system |
| 68 | lens optical system |
| 69 | amplifier |
| 70 | amplifier |
| 71 | controller |
| 72 | fluorescence excitation light source |
| 73 | controller |
| 74 | signal light source unit |
| 75 | optical fiber |
| 76 | optical fiber demultiplexer |
| 77 | multi-core optical fiber |
| 77A | illumination core |
| 77B | light reception core |
| 77C | clad |
| 78 | drive mechanism |
| 79 | lens optical system |
| 80 | multimode optical fiber |
| 81 | controller |
| 82 | capsule enclosure |
| 83 | illumination LED |
| 84 | condenser lens system |
| 85 | signal processor |
| 86 | signal transmitter |
| 87 | laser scanning fluorescence microscope |
| 88 | Ar laser |
| 89 | light intensity modulator |
| 90 | X-Y galvanomirror |
| 91 | pupil projection lens |
| 92 | imaging lens |
| 93 | dichroic mirror |
| 94 | objective lens |
| 95 | lens |
| 96 | pinhole |
| 97 | lens |
| 98 | dichroic mirror |
| 100 | biological tissue |
| 101 | live cell sample |

What is claimed is:

1. A photodetector device comprising:
a local light emitting unit for generating a local light in temporally unstable interference condition with a light to be detected; and
a photoelectric conversion unit for generating beat signals between the local light and the light to be detected by photoelectric conversion, wherein the light to be detected is detected in heterodyne detection based on an output of the photoelectric conversion unit.

2. The photodetector device according to claim 1, wherein balanced detection is performed by the photoelectric conversion unit.

3. The photodetector device according to claim 1, wherein the local light emitting unit comprises a plurality of light sources.

4. The photodetector device according to claim 1, wherein the local light emitting unit comprises a light filtering unit for selecting a defined optical frequency component.

5. The photodetector device according to claim 1, wherein the local light emitting unit comprises an optical spectrum shaping unit for shaping an optical spectrum to a desired form.

6. The photodetector device according to claim 1, wherein the local light emitting unit comprises a fluorescence emitting unit.

7. The photodetector device according to claim 1, wherein a spatial filtering unit for selecting only the light with desired spatial distribution is provided upstream of the photoelectric conversion unit.

8. The photodetector device according to claim 1, wherein a spatial light homogenizer unit for homogenizing spatial distribution of a spatial light intensity is provided upstream of the photoelectric conversion unit.

9. The photodetector device according to claim 1, wherein an envelope detection unit for detecting an envelope of the output of the photoelectric conversion unit is provided.

10. The photodetector device according to claim 1, wherein the light to be detected and the local light are divided from an output of the same light source and a relative delay time between the light to be detected and the local light upon incidence on the photoelectric conversion unit is longer than coherence time.

11. The photodetector device according to claim 1, wherein the optical spectrum line width of the local light is wider than a signal processing bandwidth of the photoelectric conversion unit.

12. A photodetection method comprising:
a local light generation step for generating a local light having a wider spectrum line width than a bandwidth of a detection system and temporally unstable interference condition with a light to be detected; and
a photoelectric conversion step for generating beat signals between the local light and the light to be detected by photoelectric conversion, wherein the light is detected in heterodyne detection based on an output of the photoelectric conversion unit.

13. A photodetection method according to claim 12 comprising:
performing balanced detection in the photoelectric conversion step.

14. A microscope comprising a photodetector device according to claim 1 for detecting light from an observation sample, wherein the light from the observation sample is detected in heterodyne detection.

15. An endoscope comprising a photodetector device according to claim 1 for detecting light from a body cavity to observe the body cavity, wherein the light from the body cavity is detected in heterodyne detection.

16. An endoscope for detecting light from a body cavity to observe the body cavity comprising:
a light generating unit for generating irradiation light;
a scanning unit for scanning the irradiation light on a sample;
a light transmitting optical system for transmitting light transmitted, reflected, scattered, refracted or diffracted on the sample; and
a photodetector device according to claim 1, wherein the light to be detected from the body cavity is detected in heterodyne detection by the photodetector device.

* * * * *